July 2, 1957   A. F. NYCZ ET AL   2,797,520
FISH LURE
Filed March 21, 1955
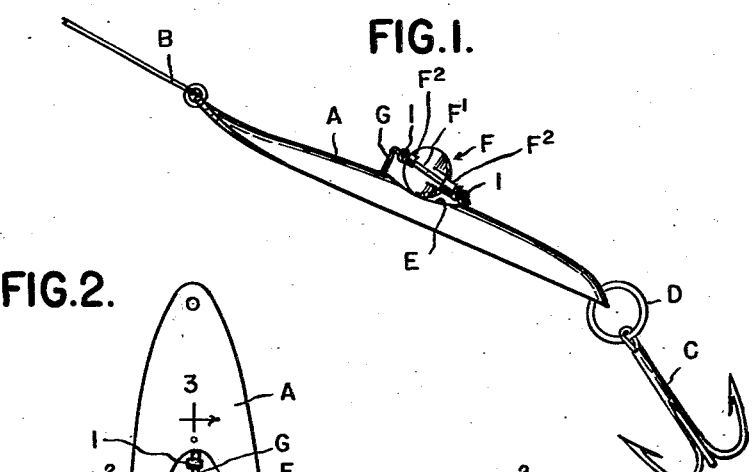
INVENTORS
ANTHONY F. NYCZ
OLLIE J. DRZAZDZYNSKI
BY
ATTORNEYS United States Patent Office 2,797,520
Patented July 2, 1957

2,797,520

FISH LURE

Anthony F. Nycz, Romulus, and Ollie J. Drzazdzynski, Detroit, Mich.; said Drzazdzynski assignor to said Nycz Application March 21, 1955, Serial No. 495,653

4 Claims. (Cl. 43—42.12)

The invention relates to fish lures and more particularly to constructions designed for use in trolling. Two types of lures have been used for this propose. First, a spoon which is connected to the line so as to dodge back and forth while the line is drawn forward. The other type is a spinner which is revolved by the forward movement of the line. In our improved construction we combine these two features in one, the spoon being the major part but the spinner being carried thereby to form an added lure. The invention, therefore, consists in the construction as hereinafter set forth.

In the accompanying drawings:

Fig. 1 is a side elevation of the lure shown attached to the line in position for forward movement therewith.

Fig. 2 is a plan view of the spoon having the spinner attached thereto.

Fig. 3 is an enlarged section on line 3—3, Fig. 2, illustrating the attachment between the spinner and the spoon, the spinner and mounting therefor being shown in full.

The spoon A may be of ordinary form which is concavo-convex in cross section. The line B is attached to the forward end of the spoon and the hook C is attached by a ring D to an eye in the rear end of the spoon. Centrally, the spoon is cut away to form an opening E and registering with this opening is a spinner F. The latter is mounted on a fine wire G and is fashioned to revolve thereabout, being actuated by the water current in contact therewith. Preferably, the wire G extends obliquely from the rear end of the opening E to the forward end thereof and is then turned inward towards the spoon. The ends of the wire may be attached to the underside of the spoon by screws H or other securing means. The spinner may be formed of very thin metal or other suitable material which is stamped to the proper shape. The central portion is struck out to form an open ended channel F' through which the wire G is threaded with reversed bearings $F^2$ at the opposite ends thereof. Beads I sleeved on the wire at opposite ends of the spinner form end thrust bearings therefor.

When the spoon A is drawn forward through the water, the currents flowing outside and inside the same and also through the aperture E, will cause the rapid spinning of the member F. The location of the spinner is such as to be protected from injury by the spoon which extends both forward and in rear of the same, as well as upon opposite sides. Though small in size it is, nevertheless, effective as a lure.

What we claim as our invention is:

1. A fish lure comprising a cancavo-convex spoon connected between the line and hook and having a small opening centrally thereof, a spinner mounted over said opening on the convex face of said spoon with its axis of rotation spaced outward from and extending longitudinally of said surface, said opening providing clearance for the inner portion of a path of rotation of said spinner.

2. A construction as in claim 1 in which said spinner is mounted on a wire attached to the spoon at the rear edge of said opening and extending obliquely outward centrally over the same and then inward to attachment adjacent the forward edge of said opening.

3. The construction as in claim 2 in which said wire passes through apertures in the spoon and is secured on the concave face thereof.

4. The construction as in claim 1 in which the spinner is formed from a thin sheet with portions struck out in opposite directions to form an open ended channel through which the wire is threaded.

References Cited in the file of this patent

UNITED STATES PATENTS

| Des. 79,681 | Wright et al. | Oct. 22, 1929 |
| 1,785,310 | Johnson | Dec. 16, 1930 |
| 2,467,151 | Nordquist | Apr. 12, 1949 |
| 2,562,743 | Schindler et al. | July 31, 1951 |
| 2,630,649 | Arbogast | Mar. 10, 1953 |
| 2,731,757 | Parth | Jan. 24, 1956 |

FOREIGN PATENTS

| 606,994 | Great Britain | Aug. 24, 1948 |
| 853,859 | France | Dec. 16, 1939 |